United States Patent [19]

Holubka et al.

[11] Patent Number: 4,554,188

[45] Date of Patent: Nov. 19, 1985

[54] CHAIN-EXTENDABLE CROSSLINKABLE URETHANE MODIFIED POLYHYDROXY OLIGOMERS AND COATING COMPOSITION COMPRISING SAME

[75] Inventors: Joseph W. Holubka, Livonia; Ray A. Dickie, Birmingham, both of Mich.

[73] Assignee: Ford Motor Company, Dearborn, Mich.

[21] Appl. No.: 455,699

[22] Filed: Jan. 5, 1983

Related U.S. Application Data

[62] Division of Ser. No. 334,798, Dec. 28, 1981, abandoned.

[51] Int. Cl.[4] .................. B05D 3/02; C08L 75/08
[52] U.S. Cl. .................. 427/393.5; 524/700; 524/765; 525/509; 525/528; 528/45; 560/24; 560/25; 560/157; 560/158
[58] Field of Search .............. 528/45; 525/528, 509; 560/24, 25, 157, 158; 427/393.5; 524/700, 765

[56] References Cited

U.S. PATENT DOCUMENTS

| | | | |
|---|---|---|---|
| 2,568,885 | 9/1951 | Dreyfus | 528/45 |
| 2,882,260 | 4/1959 | Bartl et al. | 525/382 |
| 3,087,912 | 4/1963 | Wagner et al. | 525/456 |
| 3,115,479 | 12/1963 | Windemuth et al. | 528/45 |
| 3,248,371 | 4/1966 | Damusis | 528/45 |
| 3,393,177 | 7/1968 | Guest et al. | 528/45 |
| 3,442,974 | 5/1969 | Bremmer | 525/490 |
| 3,542,718 | 11/1970 | Davis | 524/769 |
| 3,544,524 | 12/1970 | Muller et al. | 528/74 |
| 3,597,495 | 8/1971 | Sekamkes | 428/425.3 |
| 3,621,000 | 11/1971 | Schmelzer | 528/45 |
| 3,626,023 | 12/1971 | Birzgys | 427/383.1 |
| 3,661,840 | 5/1972 | Deutsch | 523/440 |
| 3,745,138 | 7/1973 | Koerner et al. | 524/557 |
| 3,808,160 | 4/1974 | Steinmetz | 524/733 |
| 3,823,118 | 7/1974 | Matsunaga | 528/45 |
| 3,893,978 | 7/1975 | De Cleur | 528/45 |
| 3,914,335 | 10/1975 | Tugukuni et al. | 525/293 |
| 3,933,759 | 1/1976 | Hoeschele | 528/45 |
| 3,947,426 | 3/1976 | Lander | 260/77.5 TB |
| 3,962,521 | 6/1976 | Chang et al. | 428/304.4 |
| 3,984,376 | 10/1976 | Yokono | 528/45 |
| 4,017,456 | 4/1977 | Tucker | 524/91 |
| 4,017,556 | 4/1977 | Wang | 428/412 |
| 4,046,729 | 9/1977 | Scriven et al. | 524/589 |
| 4,089,844 | 5/1978 | Togu | 528/45 |
| 4,096,101 | 6/1978 | Blahak et al. | 521/136 |
| 4,096,291 | 6/1978 | Dunwald et al. | 427/120 |
| 4,101,473 | 7/1978 | Lander | 524/31 |
| 4,125,570 | 11/1978 | Chang et al. | 524/89 |
| 4,134,865 | 1/1979 | Tomiwaga | 528/45 |
| 4,153,775 | 5/1979 | Winkelmann et al. | 528/45 |
| 4,284,572 | 8/1981 | Stanley | 528/45 |
| 4,294,940 | 10/1981 | Hino | 528/45 |
| 4,315,840 | 2/1982 | Kempter et al. | 528/45 |

FOREIGN PATENT DOCUMENTS

| | | |
|---|---|---|
| 1600530 | 9/1970 | France . |
| 2234357 | 1/1975 | France . |
| 837599 | 7/1976 | France . |
| 968102 | 8/1964 | United Kingdom . |
| 1006132 | 9/1965 | United Kingdom . |
| 1261313 | 1/1972 | United Kingdom . |

*Primary Examiner*—Wilbert J. Briggs, Sr.
*Attorney, Agent, or Firm*—Peter D. McDermott; Roger L. May

[57] ABSTRACT

High solids, solvent-based resin composition comprises novel chain-extendable, crosslinkable urethane modified polyhydroxy oligomers, crosslinking agent and, preferably, catalyst(s). The composition cures at elevated temperature to provide a coating on a substrate, such as steel, which is highly resistant to corrosion, humidity and solvents and provides corrosion protection for the substrate. The novel oligomers can be the reaction product of a polyol with a half-blocked diisocyanate, wherein said polyol comprises three or more hydroxy, and the half-blocked diisocyanate comprises the reaction product of an organic diisocyanate with approximately one molar equivalent of a monofunctional blocking agent.

19 Claims, No Drawings ns of VOC reduced near to, or preferably even lower than, the 350 g/l governmental limit.

In response to these concerns, high solids coating compositions have been suggested which, typically, employ low molecular weight multi-functional adducts or copolymers in combination with multi-functional crosslinking agents. These high solids coating compositions are less viscous and, therefore, can be applied by spraying, for example, with far lower VOC than was possible with conventional epoxy ester based coating compositions or other conventional coating compositions comprising high molecular weight polymer resins. After application to the substrate, high solids coating compositions are cured by baking at a cure temperature, that is, at an elevated temperature suitable to drive off the volatile organic content and to promote polymerization and crosslinking of the multi-functional low molecular weight component(s).

Typically, high solids coating compositions yield cured coatings having polymeric networks that differ significantly in structure and morphology from the polymeric networks provided by conventional, low solids coating compositions comprising high molecular weight polymers. Consequently, the physical properties of the coatings provided by such high solids coating compositions can differ significantly from those of the cured coatings provided by the conventional, low solids coating compositions. In particular, the cured coatings obtained from known high solids coating compositions can be inferior in that they can be less flexible, less solvent resistant, less adherent to the substrate and/or for other reasons provide less corrosion inhibition for the underlying substrates. Accordingly, it would be highly desirable to provide a coating composition comprising low molecular weight materials suitable for use in high solids, solvent based coating compositions and yet which, upon curing, form coatings having polymeric networks similar in structure and morphology to those obtained with conventional low solids solvent-based coating compositions, and thus having physical properties comparable to those obtained from conventional low solids solvent based coating compositions.

Accordingly, it is an object of the present invention to provide novel low molecular weight oligomers suitable for use in high solids, solvent-based coating compositions. In this regard, it is a particular object of the invention to provide novel low molecular weight oligomers which are chain-extendable and crosslinkable during cure, in situ, on the surface of a substrate to form polymeric networks similar in structure and morphology to those obtainable through use of conventional low solids, solvent-based coating compositions.

It is another object of the invention to provide a novel coating composition comprising such novel chain-extendable, crosslinkable oligomers. In this regard, it is a particular object of the invention to provide a coating composition of sufficiently low VOC to meet governmental guidelines. It is also an object of the invention to provide a coating composition which can be applied to a substrate by spraying or other known method.

It is another object of the invention to provide a method of making a coating on a substrate, which coating has a polymeric network similar in structure and morphology to that provided by conventional low solids solvent-based coating compositions and having similar advantageous physical properties including, for example, humidity and solvent resistance and corrosion

CHAIN-EXTENDABLE CROSSLINKABLE URETHANE MODIFIED POLYHYDROXY OLIGOMERS AND COATING COMPOSITION COMPRISING SAME

RELATED CASES

This application is related to concurrently filed application Ser. Nos. 334,792, 334,793, 334,794, 334,795, 344,796, 334,797 and 334,842. This is a division of application Ser. No. 334,798, filed Dec. 28, 1981, now abandoned.

INTRODUCTION

This invention relates to novel chain-extendable, crosslinkable urethane modified polyhydroxy oligomers and to high solids, solvent-based, thermosetting coating compositions comprising same, which compositions are useful to make coatings which are highly resistant to corrosion, humidity and solvents.

BACKGROUND OF THE INVENTION

Solvent based coating compositions are known which employ high molecular weight (e.g. 2,000 to 10,000) polymer resins having crosslinking functionality, and a suitable crosslinking agent. Typically, such coating compositions are applied to a substrate, for example, by spraying, and are then cured by baking the coated substrate at an elevated temperature suitable to drive off the organic solvent and to promote the crosslinking reaction. The resulting thermoset coating, if sufficiently humidity and solvent resistant, can provide aesthetic and functional advantages including corrosion protection for the underlying substrate.

Coating compositions comprising such high molecular weight polymer resins typically comprise only 25% to 50% solids so as to be sprayable or otherwise conveniently applicable to a substrate. The viscosity of coating compositions of higher solids content is typically too high for this purpose. Conventional epoxy ester based automotive vehicle spray primers, for example, typically have a volatile organic content ("VOC") of approximately 540 g/l.

Elimination of the volatile organic solvent portion during curing of these conventional low-solids coating compositions presents toxicity and in some cases flammability hazards. Furthermore, bulk volume of these coating compositions is relatively large and therefore presents undesirable material handling difficulties, and added expense. Furthermore, excessive solvent losses and/or solvent recovery equipment add considerable expense to the coating operation. Recently, governmental regulations on hydrocarbon emissions, particularly applicable to automotive coating operations, mandate a significant reduction in volatile organic content for coating compositions. Thus, for example, governmental guidelines for 1982 presently require that emissions of volatile organics from automotive vehicle primer coating operations be reduced to that equivalent to using coating compositions of no greater than 350 g/l (2.9 lb./gal.) VOC. To meet that guideline, coating compositions of VOC greater than 350 g/l can be employed in conjunction with emissions treatment equipment to achieve the specified emissions limit. Such treatment presents significant additional expense, however, and thus there is a great need to provide coating composiprotection for the underlying substrate. Additional aspects and advantages of the invention will be apparent from the following description thereof.

SUMMARY OF THE INVENTION

According to the present invention, low molecular weight chain-extendable, crosslinkable oligomers are provided which are suitable for use in high solids, organic solvent based coating compositions. As used herein, a high solids coating composition is one comprising polymerizable oligomers in which a volatile organic solvent content of about 400 g/l (3.4 lb./gal.) or less yields a viscosity of less than approximately 35 sec. #4 Ford Cup at 27° C. (80° F.).

The novel chain-extendable, crosslinkable oligomers of the invention are urethane modified polyhydroxy oligomers of number average molecular weight ($M_n$) between about 200 and about 1500, more preferably between about 300 and about 1100. The oligomers comprise latent interreactive bifunctionality suitable for substantially linear chain-extension polymerization, in situ, on the surface of the substrate during cure of the coating. The oligomers further comprise hydroxy crosslinking functionality. That is, the novel oligomers of the invention form coatings on a substrate employing two distinct, independent reactions, a chain-extension polymerization reaction, to form high molecular weight hydroxy functional polyurethanes and a crosslinking reaction between said hydroxy functional polyurethanes (and/or the urethane modified polyhydroxy oligomers before polymerization thereof) and a suitable crosslinking agent.

More specifically, the urethane modified polyhydroxy oligomers comprise two or more hydroxy and a single blocked isocyanate functionality. The oligomers preferably comprise the reaction product of a polyol with a half-blocked diisocyanate, wherein the polyol comprises three or more hydroxy groups and the half-blocked diisocyanate comprises the reaction product of an organic diisocyanate with approximately one molar equivalent of a monofunctional blocking agent.

According to the coating composition aspect of the invention, a high solids, organic solvent based thermosetting resin composition comprises the novel chain-extendable, crosslinkable oligomers of the invention, suitable crosslinking agent such as, for example, aminoplast crosslinking agent, and, preferably, a catalyst for the crosslinking reaction and/or for the chain-extension reaction, and suitable organic solvent such as, for example, butanol or other lower alkanol.

According to another aspect of the invention, a method of making a corrosion, solvent and humidity resistant coating on a substrate comprises applying to the substrate the high-solids, solvent-based thermosetting resin composition of the invention comprising the novel chain-extendable, crosslinkable oligomers of the invention, and heating the resin compositions to between about 100° C. and about 190° C. and preferably to between about 130° C. and about 150° C. for a period sufficient to yield a cured coating.

DETAILED DESCRIPTION OF THE INVENTION

Preferred chain-extendable, crosslinkable urethane modified polyhydroxy oligomers of the invention are prepared by reaction of a polyol with a half-blocked diisocyanate. The polyol bears three or more hydroxyl groups, preferably about from 3 to 10 hydroxyl, such that the oligomer product of its reaction with the half-blocked diisocyanate provides an unreacted hydroxyl for chain-extension reaction as well as at least one additional unreacted hydroxy functionality for crosslinking reaction with a suitable crosslinking agent such as, for example, an aminoplast crosslinking agent. The polyol preferably has a molecular weight between about 100 and 1000, and more preferably between about 300 and 700 to provide an oligomer product which in solution provides suitably low viscosity for use in high solids coating compositions. Exemplary polyols suitable for the present invention include polyhydroxy functional straight or branched chain saturated or unsaturated hydrocarbons, optionally bearing one or more oxy or ester moieties and optionally bearing one or more heterocyclic atoms, aromatic and/or heterocyclic ring, the heterocyclic atom(s) being selected preferably from N, O and S. Suitable polyol reactants include many commercially available materials well known to the skilled of the art.

Preferred chain-extendable, crosslinkable oligomers of the invention are the reaction product of half-blocked diisocyanates with certain preferred polyols. These preferred polyols comprise an epoxy-diol adduct, more specifically the reaction product of a suitable diepoxide with diol. Preferred diepoxides are terminal diepoxides, that is, diepoxides bearing two terminal epoxide functionality, since these are generally more reactive and therefore require reaction conditions under which undesirable side reactions, for example, epoxy-epoxy reactions and gellation, can be more easily avoided. Most preferred in view of their commercial availability are Bisphenol A epichlorohydrin epoxy resins, for example, Epon 828 (trademark), Shell Chemical Co., Houston, Tex. Other, higher molecular weight members of the Epon (trademark) series are suitable to make higher molecular weight oligomers of the invention which provide coating compositions of somewhat higher viscosity (or lower solids content). It should be recognized, however, that the higher molecular weight members of the Epon series, for example Epon 1001 and Epon 1004, may be somewhat less preferred for preparing oligomers of the invention, since the hydroxyl group(s) thereof can be less sterically hindered and therefore more reactive. This can result in undesirable side reactions, for example, reaction between the epoxy functionality of one diepoxide molecule and such hydroxy functionality of another diepoxide molecule (rather than with an hydroxyl group of a diol). The result can be undersirable oligomer properties and gellation. Also, however, improved properties, for example, improved corrosion resistance, have been achieved with coating compositions comprising oligomers prepared using such materials and the choice of suitable oligomer (and reactants for preparing same) will depend upon the particular application intended for the coating composition comprising the oligomer. Also preferred are hydantoin epoxy resins and any of a wide variety of acyclic or cyclic aliphatic diepoxides such as, for example, 1,4-butanediol diglycidyl ether and 4-vinylcyclohexene dioxide and the like or a mixture of any of them.

Preferably the diepoxide has a number average molecular weight ($M_n$) between about 100 and about 1000, and more preferably between about 100 and about 600. Numerous such preferred diepoxides are readily commercially available, for example, Bisphenol A epichlorohydrin epoxy resin, for example, the Epon (trademark) series, Shell Chemical Company, Houston, Tex., and the DER (trademark) series, Dow Chemical Company, Midland, Mich. Also preferred are cycloaliphatic diepoxy resins, for example the Eponex (trademark) series, Shell Chemical Company, Houston, Tex., and Resin XB2793 (trademark), Ciba-Geigy Corporation, Ardsley, N.Y. (hydantoin epoxy resin).

The diol can be any of a wide variety of readily commercially available dihydroxy functional materials of which many are known to the skilled of the art. Preferred diols include those of molecular weight about from 60 to 500, more preferably about from 60 to 200. Most preferred are terminal diols, that is, diols bearing two terminal hydroxyl groups, for example, 1,6-hexanediol, since these are generally more reactive. Other suitable aliphatic diols include primary/secondary and secondary/secondary carbon hydroxy substituted diols. Diols bearing tertiary hydroxyl groups are least preferred due to their lower reactivity. Preferred aliphatic diols include, for example, aliphatic diols of about two to twenty carbons, for example, ethylene glycol, 1,3-propanediol, 1,4-butanediol, 1,5-pentanediol, 2-ethyl-1,3-hexanediol and the like, or a compatible mixture of any of them. Other suitable aliphatic diols include ether diols, for example those of four to about twenty carbons, for example, triethylene glycol and the like. Suitable aromatic diols include those wherein one or both hydroxy groups are substituted on a benzene ring. Preferred aromatic diols comprise two hydroxyl groups substituted on the same benzene ring or on different benzene rings linked through a covalent bond or through one or more carbons of a one to seven carbon, preferably three to five carbon, aliphatic moiety. Suitable aromatic diols include, for example, 4,4'-isopropylidenediphenol, for example, Bisphenol A, (trademark, Shell Chemical Company), 4,4'-(1-methylpropylidene)bisphenol Bisphenol B (trademark, Shell Chemical Company), catechol and the like, or a compatible mixture of any of them. In general, aliphatic diols have been found to provide cured coatings of greater flexibility and better corrosion resistance in comparison to aromatic diols.

The diepoxide is reacted according to methods well known to the skilled of the art, preferably by slow addition to sufficient excess of diol such that substantially every epoxide group reacts with an hydroxyl group of a different diol molecule. The resultant epoxy-diol adduct comprises four hydroxyl groups: the unreacted hydroxyl group of each of the two diol molecules which reacted with the diepoxide, and the hydroxyl group formed by each of the two cleaved epoxide rings. Employing a terminal diol, that is, a diol bearing two terminal hydroxyl groups, and terminal diepoxide, the polyol reaction product has two terminal hydroxyls, each linked through a diol residue to the dihydroxy substituted diepoxide residue. Whether or not the polyol comprises epoxy/diol adduct, as just described, it is preferred that two of the three or more hydroxyls of the polyol be remote from one another and most preferred that they be terminal hydroxyls as defined above.

The half-blocked diisocyanate with which the above described polyol is reacted to produce oligomers according to the invention preferably has a molecular weight of about from 100 to 500, and can be the reaction product of any of a wide variety of organic diisocyanates with approximately one molar equivalent of a monofunctional blocking agent. Suitable diisocyanates are readily commercially available and include many known to the skilled of the art such as, for example, phenylene diisocyanate, toluene diisocyanate, isophorone diisocyanate, diisocyanatoalkane wherein the alkyl moiety has preferably about three to about ten carbons, for example, 1,6-diisocyanatohexane and the like, or a compatible mixture of any of them. If corrosion resistance is of primary concern in the cured coating, for example in the case of an automotive vehicle primer or topcoat, it may be preferred to use an aliphatic diisocyanate, for example, isophorone diisocyanate and 1,6-hexane diisocyanate. Aromatic diisocyanates provide suitable coatings, however, and may be preferred in view of their lower cost.

The diisocyanate is half-blocked prior to reaction with the polyol. That is, one of the two isocyanate functionalities of the diisocyanate molecule is reacted with monofunctional blocking agent. The unblocked isocyanate functionality can then react with an hydroxyl group of the polyol to yield an oligomer according to the present invention bearing the blocked isocyanate functionality. Suitable half-blocked diisocyanates can be obtained from the reaction of organic diisocyanate with sufficient mono-functional blocking agent to block approximately one half of the isocyanate functionality. Accordingly, approximately one molar equivalent of mono-functional blocking agent is reacted with one molar equivalent of the organic diisocyanate. Suitable techniques well known to the skilled of the art can be employed to maximize the yield of half-blocked diisocyanate, such as, for example, adding the blocking agent slowly to the organic diisocyanate under reaction conditions.

Suitable mono-functional blocking agents are well known to the skilled of the art, and readily commercially available. The blocking agent is selected such that the blocked isocyanate group will remain blocked for long periods of time at normal storage temperatures, but will be substantially totally "de-blocked" at elevated "cure" temperature. In addition, since the blocking agent will be released when the oligomer is cured by baking, it is preferred that the blocking agent have high volatility near its de-blocking temperature and so will diffuse rapidly through the coating composition and evaporate completely therefrom during the baking step. Any blocking agent allowed to remain in the cured coating must be inert to the cured coating and to the substrate and to any other coatings to be used in conjunction with it. It is within the skill of those skilled in the art to select a suitable blocking agent to provide a de-blocking temperature meeting the requirements of each particular application of the present invention. Typically, the blocked isocyanate functionality of the oligomers of the invention will be de-blocked at a temperature within the range of about 120° to 200° C. Preferred monofunctional blocking agents are selected from amides, for example caprolactams, phenols, ketoximes, and lower alcohols, for example, alcohols of one to about eight carbons, for example methanol, ethanol, any propanol, any butanol, any pentanol, including cyclopentanol, and the like, or a mixture of any of them.

The half-blocked diisocyanate is reacted with the previously described polyol according to methods well known to the skilled of the art to produce an oligomer according to the present invention. The free (i.e., unreacted) isocyanate group of the half-blocked diisocyanate reacts with an hydroxyl group of the polyol forming a urethane linkage. The product oligomer comprises two or more hydroxyls and a single blocked isocyanate functionality. During cure, therefore, each oligomer molecule provides a single isocyanate for chain-extension reaction with an hydroxyl group. It will be recognized by the skilled of the art that where the oligomer is prepared by reaction of an epoxy/diol adduct with a half-blocked diisocyanate according to the preferred embodiments described above, even where the epoxy/diol adduct comprises two hydroxyl end groups, a mixed reaction product could result, since the unblocked isocyanate could react with any of the one or more non-end group hydroxyl of the polyol. While not wishing to be bound by theory, however, it is presently understood that the isocyanate reacts predominately with the least sterically hindered hydroxyl, that is, with an end group hydroxyl of the polyol.

The oligomer comprises latent interreactive bifunctionality suitable for substantially linear chain-extension polymerization and further comprises hydroxy functionality suitable for crosslinking reaction separate and distinct from the chain-extension reaction. It is preferred that the blocked isocyanate and one of the two or more hydroxyls of the oligomer be remote from one another. It is most preferred that they each be an end group at opposite ends of the oligomer. Reaction between such hydroxyl end group and blocked isocyanate end group functional oligomers provide most efficient chain-extension during cure.

The number average molecular weight of the oligomer according to the present invention will affect the volatile organic content of the coating composition comprising same. Preferably, the number average molecular weight is within the range of about 300 to 1100, since this has been found to provide high-solids coating compositions which can be easily applied to a substrate by spray or other means at a calculated volatile organic content of about 350 g/l (2.9 lb./gal.) or less.

According to the coating composition aspect of the present invention, the above-described novel chain-extendable, crosslinkable urethane modified polyhydroxy oligomers of the invention are employed in a solvent-based coating composition, preferably together with suitable multi-functional crosslinking agent. Suitable crosslinking agent is that which will react with the hydroxy functionality of the long chain polymer product of the chain-extension polymerization reaction of the oligomers during cure. Suitable crosslinking agents will not react, however, with the de-blocked isocyanate group. Accordingly, crosslinking reaction in the preferred coating composition is a reaction separate and distinct from the hydroxyl-isocyanate chain-extension reaction. Numerous such crosslinking agents are well known to the skilled of the art and include, for example, any of a variety of aminoplast crosslinking agents, for example, partially alkylated melamines (melamine formaldehyde resins modified by alcohols), for example, partially methylated melamines and butylated melamines; polyalkyl ethers of the polymethylol melamines, for example, hexamethoxy methylmelamine; urea formaldehyde condensate modified by alcohol, for example, butylated urea resin; polymerides of formaldehyde, for example, paraformaldehyde and trioxane; polymethylol compounds of hexamethylene diurea; adipic acid dimethylol amide and methylol ether thereof; tetramethylolhydrazodicarbonamide; polymethylol compounds of polycaprolactam and methylol ethers thereof and the like or mixtures of any of them. Other suitable crosslinking agents will be apparent to the skilled of the art in view of the present disclosure. Hexamethoxymethyl melamine is preferred since it is readily commercially available and has been found to provide suitable crosslinking activity.

The proper proportion of crosslinking agent to oligomers will depend upon the properties desired in the coating to be produced. Where hexamethoxymethyl melamine is employed with preferred oligomers of the invention comprising two crosslinking hydroxy functionalities per oligomer, a weight ratio of crosslinking agent to oligomer of about from 1:1 to 1:15, respectively, is generally preferred, and about 1:1 to 1:5 is generally more preferred. Too much crosslinking agent will prevent proper chain-extention and can produce a coating which is brittle and humidity sensitive. If too little is used, the coating will not cure properly.

It will be within the skill of the art to determine the proper volatile organic content for a given oligomer (or mixture of oligomers) of the invention, for a given application. In general, preferred solvents are those having a boiling point between about 60° C. and 200° C., more preferably between about 110° C. and 170° C. at atmospheric pressure. Preferred solvents include, for example, butanol, methyl amyl ketone and the like, or a mixture thereof such as a 1:2 mixture of butanol and methyl amyl ketone, respectively, which is generally preferred. Additional suitable solvents will be apparent to the skilled of the art in view of the present disclosure.

Any solvent allowed to remain in the cured coating should be inert so as to avoid adverse effect upon the cured coating or upon another coating used in conjunction with it, during the curing process or thereafter. Preferrably, the finished cured product is completely free of solvent. Preferred solvents, in addition, have relatively low volatility at temperatures appreciably below their boiling points such that solvent evaporation is low during storage and/or application of the coating composition to the substrate.

Sufficient solvent is used to reduce the viscosity of the coating composition to a level suitable for application to the substrate in the desired manner. While conventional epoxy ester-type automotive spray-applied primer coating compositions are known to require a volatile organic content of about 540 g/l, comparable coating compositions comprising instead the novel, low molecular weight oligomers of the present invention require as little as 350 g/l or less VOC to provide a spray viscosity of 25–35 sec, #4 Ford Cup. Of course, the coating compositions of the invention need not be formulated as a "high solids" composition, but rather can have a higher VOC to provide a lower viscosity. It is generally preferred that sufficient solvent be used to provide a viscosity of about 15 to 35 seconds, No. 4 Ford Cup at 27° C. (80° F.).

Also preferably included in the coating composition of the invention is any of a variety of acid catalysts known to the skilled of the art to catalyse the aminoplast crosslinking reaction, for example, p-toluenesulfonic acid, phosphoric acid, phenyl acid phosphate, butyl phosphate, butyl maleate, and the like or a compatible mixture of any of them. In addition, any of a variety of catalysts for the isocyanate de-blocking reaction can also be included in the coating composition, for example, dibutyl tin dilaurate. In addition, flow control agent(s), for example, polybutyl acrylate; wetting agent(s), for example, silicone; pigments; pigment dispersents; corrosion inhibitors, for example, chromate pigments, numerous of all of which are known to the skilled of the art, may be employed in the coating compositions of the invention.

It should be recognized that the coating compositions can comprise monohydroxy blocked isocyanate functional compounds in addition to the polyhydroxy functional oligomers of the invention. A molecule of such a monohydroxy compound, its hydroxyl group having reacted with a de-blocked isocyanate group to provide chain-extension, would contribute no crosslinking functionality to the high molecular weight chain-extended polymerization product. By simple adjustment of the proportion of monohydroxy compound to polyhydroxy oligomer in the coating composition, the crosslink density in the cured coating, and therefore the degree of flexibility of the cured coating can be accurately controlled. Thus, for example, monohydroxy compounds can be employed which are the reaction product of a half-blocked diisocyanate as described above and a diol (rather than a polyol having three or more hydroxy functionalities) whereby a monohydroxy blocked urethane functional oligomer is formed (rather than an oligomer according to the present invention). Such monohydroxy oligomer, having undergone chain-extension reaction with the novel oligomer of the invention, would provide no hydroxy crosslinking functionality. Monohydroxy blocked isocyanate functional compounds for use in high solids coating compositions are preferably of number average molecular weight of about 200 to 1000, more preferably about 200 to 500.

According to another aspect of the invention, a coating on a substrate is provided, which coating comprises the chain-extended, crosslinked polymer product following cure of a coating comprising the coating composition of the invention. The coating composition can be a low solids composition, that is, it can have a high VOC, but generally a high solids composition, that is, one having a low VOC is preferred for the reasons given above. It can be applied by any conventional method, including brushing, dipping, flow coating, spraying, etc. Spraying will generally be preferred, for example, for applying the composition as an automotive primer or topcoat. In such spraying applications, the novel oligomers of the invention are especially advantageous for formulating coating compositions of the invention which are high solids compositions. In this regard, coating compositions of the invention employing preferred oligomers described above are suitable to be applied to a substrate by spraying even though formulated at volatile organic content levels as low as about 330 to 360 g/l (2.7 to 3.0 lb/gal).

Curing the coating composition requires baking for sufficient time at sufficiently elevated temperature to de-block the blocked isocyanate functionality of the oligomers. The time and temperature required to cure the coating are interrelated and depend upon the particular oligomer(s), crosslinking agent(s), solvent and other materials, if any, and the amount of each comprising the coating composition. Employing a volatile organic content of about 350 g/l and selecting preferred components as described above, the bake time and temperature is typically about 20 to 30 minutes and about 180° C. The temperature required for cure can be reduced to about 150° C. for 20 to 30 minutes by addition of suitable catalyst such as any of those known to the skilled of the art, for example, dibutyl tin dilaurate and even lower by use of suitable blocking groups etc.

High solids coating compositions according to the present invention, comprising the novel chain-extendable, crosslinkable oligomers of the invention, especially the preferred urethane modified epoxy/diol adducts described above and, preferably, an aminoplast crosslinking agent, for example, hexamethoxymethyl melamine, have been found to afford cured coatings with corrosion resistance comparable to conventional epoxy ester based, low solids sprayable coating compositions. The significant reduction in volatile organic content presents, therefore, a highly advantageous advance in the art.

As it is presently understood, the single blocked isocyanate functionality of the oligomer, which is de-blocked at cure temperatures, provides substantially linear chain-extension, in situ, on the surface of the substrate during cure by reaction with an hydroxyl groups of the oligomers. The additional one or ore hydroxyl groups of each oligomer of the invention are available for crosslinking reaction with suitable crosslinker. While not wishing to be bound by theory, it is presently understood that upon curing a coating composition according to the present invention, the blocked isocyanate group of the novel oligomers of the invention is de-blocked and reacts more readily with the least sterically hindered of the two or more hydroxyl groups of another oligomer. If the oligomer comprises a terminal hydroxyl group, as in preferred embodiments described above, then the de-blocked isocyanate group would react most readily with that terminal hydroxyl group and not with any of the one or more additional, non-terminal hydroxyl group(s) of the oligomers or of an extended chain polymer already formed by the curing process. Such additional non-terminal hydroxy functionality remains available for crosslinking reaction. If, for example, the polyol employed to prepare the oligomer is an epoxy/diol adduct reaction product of a terminal diol, for example, 1,6-hexanediol, with a terminal diepoxide, for example, an hydantoin epoxy resin, then the oligomer will have a terminal hydroxy, two non-terminal hydroxy (formed by cleavage of the epoxide rings) and a terminal blocked isocyanate. During cure, according to present understanding, the isocyanate functionally will be de-blocked and will then react predominantly with the terminal hydroxyl group. The result is substantially linear chain-extension polymerization of the oligomers, in situ, on the surface of the substrate, to form long chain, high molecular weight polymers with pendant hydroxyl groups suitable for crosslinking reaction. Accordingly, the polymer networks obtained during cure of the coating compositions comprising the oligomers of the present invention are believed to be similar in structure to those obtained using conventional low solids solvent based coating compositions.

Even where the isocyanate group does not react with a terminal hydroxyl group, however, the one isocyanate group of each oligomer can react only with one other oligomer; since the isocyanate group is not reactive with the crosslinking agent, the result is substantially linear chain-extension polymerization.

In addition, network crosslink density can be controlled, and therefore the flexibility of the cured coating can to a large extent be controlled by proper selection of oligomer(s). Crosslink density increases and flexibility decreases as the hydroxy functionality is increased and/or as the molecular weight of the oligomer is reduced. Thus, it will be apparent, to the skilled of the art that if the oligomer is prepared by reaction of a polyol with a half-blocked diisocyanate, according to preferred embodiments described above, the selection of the polyol and half-blocked diisocyanate reactants provides substantial control of the crosslink density in the cured coating. The greater the hydroxy functionality of the polyol and the lower the molecular weight of the reactants, the greater will be the degree of crosslinking. Thus, for example, where the polyol is the reaction product of a diepoxide and a diol, there will be a higher crosslink density in the cured coating if the diol is 1,3-propanediol than if it is 1,6-hexanediol.

In addition, it will be recognized by the skilled of the art in view of the present disclosure that longer chain oligomers, that is, higher molecular weight oligomers will, in general, provide a more viscous coating at a given VOC. Higher molecular weight oligomers of the invention are for that reason less preferred where a high solids coating composition is desired.

Cured coatings according to the invention have been found to provide excellent corrosion resistance when applied over a metallic substrate such as, for example, when applied as an automotive vehicle primer coat over bare sheet steel. While not wishing to bound by theory, the exceptional corrosion inhibitors provided by preferred embodiments described above stem, in part, from the absence of ester linkages. Ester linkages are known to be attacked by hydroxide, a product of the metal corrosion process.

EXAMPLE I

Preparation of Epoxy/Diol Adduct

This example illustrates the preparation of an epoxy/diol adduct from a heterocyclic epoxy and a branched acyclic aliphatic diol. Hydantoin epoxy resin XB2793 (trademark, Ciba-Geigy Corporation), 138. g, 1,3-hexanediol, 146. g, and N,N-dimethylethanolamine, 0.5 g, were combined in methyl amyl ketone, 71. g, and refluxed approximately 40 hours until the epoxy infrared absorption disappeared. The low viscosity resin product was cooled to room temperature and stored.

EXAMPLE II

Preparation of Epoxy/Diol Adduct

The example illustrates the preparation of an epoxy/diol adduct from a heterocyclic epoxy and an aromatic diol. Hydantoin epoxy resin XB2793 (trademark, Ciga-Geigy Corporation), 69. g, and Bisphenol A (trademark, Shell Chemical Company), 114. g, were combined in methyl amyl ketone, 45.8 g, and refluxed approximately 4 hours until the epoxy infrared absorption disappears. The resin product was cooled to room temperature and stored.

EXAMPLE III

Preparation of Half-blocked Diisocyanate

This example illustrates the preparation of an alcohol half-blocked aliphatic diisocyanate. Butyl alcohol, 74. g was added dropwise to a mixture of isophorone diisocyanate, 222. g, and dibutyl tin dilaurate, 0.5 g, and methyl amyl ketone, 74. g. After addition of the alcohol, the mixture was heated to between 60°–80° for 2 hours. (Higher temperatures were avoided to avoid undesirable side reactions.) The half-blocked diisocyanate product was characterized by infrared spectroscopy showing the absence of OH absorption at 3300 cm$^{-1}$, a reduction in N=C=O absorption at 2250 cm$^{-1}$ and the presence of urethane N-H and carbonyl absorptions at 3250 cm$^{-1}$ and 1730 cm$^{-1}$, respectively.

EXAMPLE IV

Preparation of Urethane Modified Epoxy/Diol Resin

A novel oligomer according to a preferred embodiment of the invention, an isophorone diisocyanate modified-hydantoin epoxy/Bisphenol A resin (trademark, Shell Chemical Company), was prepared by combining 75. g of the half-blocked diisocyanate product of Example III with 228.8 g of the epoxy/diol adduct product of Example II. The mixture was stirred with heating at about 100° C. for about 3 to 4 hours, until substantially all the isocyanate had reacted, as determined by infrared spectroscopy. The urethane modified epoxy/diol resin product was cooled to room temperature and stored.

EXAMPLE V

Preparation of Urethane Modified Epxoy/Diol Resin

A novel oligomer according to a preferred embodiment of the invention, an isophorone diisocyanate modified-hydantoin epoxy/2-ethyl-1,3-hexanediol resin, was prepared by combining 197. g of the half-blocked diisocyanate product of Example III with 284. g of the epoxy/diol adduct product of Example I. The mixture was stirred with heating to about 100° C. for about 3 to 4 hours, until substantially all the isocyanate had reacted, as determined by infrared spectroscopy. The urethane modified epoxy/diol resin product was cooled to room temperature and stored.

EXAMPLE VI

A novel oligomer according to a preferred embodiment of the invention, was prepared by a three step procedure.

A. Preparation of Epoxy/Diol Adduct

An aromatic epoxy/branched chain aliphatic diol adduct was prepared by refluxing a mixture of Epon 828 (trademark, Shell Chemical Company), 190. g, 2-ethyl-1,3-hexanediol, 146. g, methyl amyl ketone, 84. g, and N,N-dimethylethanol amine, 0.5 g, for about 4 to 8 hours until the infrared epoxide absorption disappears.

B. Preparation of Half-blocked diisocyanate

Butanol half-blocked isophorone diisocyanate was prepared according to the procedure of Example III.

C. Preparation of Urethane Modified Epoxy/Diol Resin

The novel oligomer of the invention was prepared by reacting at 100° C. the Epon 828/2-ethyl-1,3-hexanediol adduct product of step A, 163.2 g, with butanol half-blocked diisocyanate product of step B, 92.5 g. Reaction was allowed to proceed until no isocyanate infrared absorption is detected. The urethane modified epoxy/diol resin product was cooled to room temperature and stored.

EXAMPLE VII

Preparation of Half-blocked Diisocyanate

This example illustrates the preparation of an alcohol half-blocked aromatic diisocyanate. Butanol, 14.8 g, was added dropwise, with stirring, to toluene diisocyanate, 35. g, in 12.5 g of methyl amyl ketone, at a rate controlled to maintain the reaction temperature at about 60° C. After addition of the butanol, the reaction mixture was stirred an additional hour at room temperature. The half-blocked diisocyanate product was verified by infrared spectroscopy as in Example III. The product was stored for later use.

EXAMPLE VIII

Preparation of Urethane Modified Epoxy/Diol Resin

A novel oligomer according to a preferred embodiment of the invention, a toluene diisocyanate modified-hydantoin epoxy/2-ethyl-1,3-hexanediol resin, was prepared by combining 133. g of the hydantoin epoxy/diol adduct product of Example I with 62.3 g of the alcohol half-blocked aromatic diisocyanate product of Example VII. The reaction mixture was heated at about 80°–90° C. for about 2 hours, until substantially all the isocyanate had reacted, as determined by infrared spectroscopy. The urethane modified epoxy/diol resin product was cooled to room temperature and stored.

EXAMPLE IX

Preparation of Urethane Modified Epoxy/Diol Resin

A novel oligomer according to a preferred embodiment of the invention, a toluene disocyanate modified-Epon 828/2-ethyl-1,3-hexane diol resin, was prepared by combining 213. g of the Epon 828/2-ethyl-1,3-hexanediol adduct product of Example VI part A with 91.4 g of 2-ethylhexanol half-blocked toluene diisocyanate in 15. g of methyl amyl ketone. (The half-blocked diisocyanate was prepared according to the procedure of Example VII, employing 2-ethylhexanol in place of butanol.) The reaction mixture was heated at 80°–90° C. for about 2 hours, until substantially all the isocyanate had reacted, as determined by infrared spectroscopy. The urethane modified epoxy/diol resin product was cooled to room temperature and stored.

EXAMPLE X

Preparation of Epoxy/Diol Adduct

This example illustrates the preparation of an epoxy/diol adduct from an aromatic epoxy and a straight chain aliphatic diol. Epon 828 (trademark, Shell Chemical Company), 190. g, 1,5-pentanediol, 78. g, and dimethylethanolamine, 0.68 g, were combined in methyl amyl ketone, 67. g. The reaction mixture was heated at 100°–130° C. for 16 hours. The product, under infrared spectroscopy, revealed no absorption for epoxy. The product was stored for later use.

EXAMPLE XI

Preparation of Urethane Modified Epoxy/Diol Resin

A novel oligomer according to a preferred embodiment of the invention, a toluene diisocyanate modified-Epon 828/1,5-pentanediol resin, was prepared by combining 367.5 g of the Epon 828/1,5-pentanediol adduct product of Example X with 170. g of 2-ethyl-1,3-hexanediol half-blocked toluene diisocyanate in 34.5 g methyl amyl ketone. (The half-blocked diisocyanate was prepared according to the procedure of Example VII, employing an equivalent amount of 2-ethylhexanol in place of butanol.) The reaction mixture was heated at 80°–90° C. for about 2 hours, until substantially all the isocyanate had reacted, as determined by infrared spectroscopy. The urethane modified epoxy/diol resin product was cooled to room temperature and stored.

EXAMPLE XII

Preparation of Epoxy/Diol Adduct

This example illustrates the preparation of an epoxy/diol adduct from an aliphatic epoxy and a branched chain aliphatic diol. Aliphatic epoxy resin, Eponex 151 (trademark, Shell Chemical Company), 234. g, 2-ethyl-1,3-hexanediol, 146. g, and N,N-dimethylethanol amine, 1. g, were combined and heated at 120°–140° C. for about 20 hours. The product, under infrared spectroscopy, showed no absorption for epoxy. The product was stored at room temperature.

EXAMPLE XIII

Preparation of Epoxy/Diol Adduct

This example illustrates the preparation of an aliphatic epoxy/aliphatic diol adduct. Aliphatic epoxy resin, Eponex 151 (trademark, Shell Chemical Company), 234. g, 1,5-pentanediol, 104. g, and N,N-dimethylethanolamine were heated at 120°–140° C. for about 20 hours. The product, under infrared spectroscopy, showed no absorption for epoxy. The product was stored at room temperature.

EXAMPLE XIV

Preparation of Novel Oligomer

Eponex 151/2-ethyl-1,3-hexanediol adduct, prepared as in Example XII, 190. g, was combined with 2-ethylhexanol half-blocked toluene diisocyanate, 85. g, in 29. g of methyl amyl ketone. (The half-blocked diisocyanate was prepared according to the procedure of Example VII, employing 2-ethylhexanol in place of butanol.) The reaction mixture was heated at 80°–100° C. for 3 hours, until substantially all the isocyanate had reacted, as determined by infrared spectroscopy. The urethane modified epoxy/diol resin product was cooled to room temperature and stored.

EXAMPLE XV

Preparation of Novel Oligomer

Eponex 151/2-ethyl-1,3-hexane diol adduct, prepared as in Example XII, 190. g, was combined with butanol half-blocked isophorone diisocyanate prepared as in Example III, 92.5 g, in 29. g methyl amyl ketone. The reaction mixture was heated at 80°–100° C. for 3 hours, until substantially all the isocyanate had reacted, as determined by infrared spectroscopy. The oligomer product was cooled to room temperature and stored.

EXAMPLE XVI

Preparation of Novel Oligomer

Eponex 151/2-ethyl-1,3-hexanediol adduct, prepared as in Example XIII, 169. g, was combined with 2-ethylhexanol half-blocked toluene diisocyanate, 85. g, in 70. g of methyl amyl ketone. The reaction mixture was heated at 80°–100° C. for 3 hours, until substantially all the isocyanate had reacted, as determined by infrared spectroscopy. The urethane modified epoxy diol resin product was cooled to room temperature and stored.

EXAMPLE XVII

Preparation of Novel Oligomer

Eponex 151/1,5-pentanediol adduct, prepared as in Example XIII, 169. g, was combined with butanol half-blocked isophorone diisocyanate, prepared as in Example III, 92.5 g, in 29. g methyl amyl ketone. The reaction mixture was heated at 80°–100° C. for 3 hours, until substantially all the isocyanate had reacted, as determined by infrared spectroscopy. The oligomer product was cooled to room temperature and stored.

EXAMPLE XVIII

Coating Composition

A coating composition suitable for use as an automotive primer coating composition was prepared according to the following formulation using conventional techniques well known to the skilled of the art.

Primer Formulation No. 1

| Part A: Pigment Package | |
|---|---|
| Grams | Pigment |
| 4.3 | Silica |
| 48.4 | Barytes |
| 0.6 | Carbon black (Neotex 130, Cities Service, Columbian Chemical Division, Akron, Ohio) |
| 6.5 | Titanium dioxide |

| Part B: Binder Package | |
|---|---|
| Grams | Organic Material |
| 58 | Toluene diisocyante modified Epon 828/1,5-pentanediol Resin (prepared as in Example XI) |
| 15 | Cymel 301 (trademark, Ciba-Geigy Corp., Ardsley, New York) (hexamethoxymethyl melamine) |
| 5 | 20% Paratoluene sulfonic acid solution in methyl ethyl ketone |
| 30 | 1:2 Butanol: Methyl amyl ketone |

A mill base was prepared by dispersing the binder package with the pigment package. Milling was continued until the resulting primer had a Hegman Gage reading of about 6.5 to 7. The primer was filtered and applied to steel test panels by conventional air atomized spray and cured at 150°–180° C. for 20 minutes.

EXAMPLE XIX

Coating Composition

A coating composition suitable for use as an automotive primer coating composition was prepared in the manner described in Example XVIII according to the following formulation, which comprises a corrosion inhibiting pigment, strontium chromate.

Primer Formulation No. 2

| Part A: Pigment Package | |
|---|---|
| Grams | Pigment |
| 39.4 | Barytes |
| 0.6 | Carbon black (Neotex 130, Cities Service, Columbian Chemical Division, Akron, Ohio) |
| 6.5 | Titanium dioxide |
| 9.0 | Strontium chromate |
| 4.3 | Silica |

| Part B: Binder Package | |
|---|---|
| Grams | Organic Material |
| 58 | Toluene diisocyanate modified Epon 828/2-ethyl-1,3-hexanediol resin (prepared as in Example IX) |
| 15 | Cymel 301 (trademark, Ciba-Geigy Corp., Ardsley, New York) (hexamethoxymethyl melamine) |
| 5 | 20% Paratoluene sulfonic acid solution in methyl ethyl ketone |
| 30 | 2:1 Methyl amyl ketone: butanol |

A mill base was prepared by dispersing the binder package with the pigment package. Milling was continued until the resulting primer had a Hegman Gage reading of about 6.5 to 7. The primer was filtered and applied to steel test panels by conventional air atomized spray and cured at 150°–180° C. for 20 minutes.

EXAMPLE XX–XXIX

Corrosion Resistance

Ten coating compositions were prepared according to the following formulations.

| Component | EXAMPLE (weight in grams) | | | | | | | | | |
|---|---|---|---|---|---|---|---|---|---|---|
| | XX | XXI | XXII | XXIII | XXIV | XXV | XXVI | XXVII | XXVIII | XXIX |
| Resin | 100. | 51.5 | 60. | 51.5 | 58. | | 60. | 60. | 60. | 60. |
| Cymel 301 | 24. | 13. | 15. | 13. | 15. | | 15. | 15. | 15. | 15 |
| 20% Para-toluene sulfonic acid in methyl ethyl ketone | 2.5 | 2.7 | 2. | 2.8 | 5.0 | | 2. | 2. | 2. | 2. |
| Silica | 5.3 | 3.9 | 3.8 | — | 4.3 | | 3.8 | 3.8 | 3.8 | 3.8 |
| Barytes | 59.8 | 44.3 | 42.7 | 42.8 | 39.4 | | 42.7 | 42.7 | 42.7 | 42.7 |
| Carbon black | .77 | .6 | .5 | .6 | .6 | | .5 | .5 | .5 | .5 |
| Titanium Dioxide | 8. | 5.9 | 5.8 | 5.7 | 6.5 | | 5.8 | 5.8 | 5.8 | 5.8 |
| Butanol: methyl amyl ketone (1:2) | 50. | 30. | 30. | 30. | 30. | | 30. | 30. | 30. | 30. |
| Dibutyl tin dilaurate | — | — | .24 | — | — | | .4 | .4 | .3 | .3 |

The resin in each coating composition consisted of a novel oligomer according to the present invention prepared according to the foregoing examples. The particular resin in each coating composition is listed below. The Roman numeral in parenthesis following the resin indicates the Example according to which it was prepared. (The figure given in Table 1 for VOC is calculated from the formulation.)

TABLE 1

| Coating Composition | Resin | VOC (g/l) | 24 Hour Salt Spray[a] | Cathodic Polarization[a] |
|---|---|---|---|---|
| XX | Isophorone diisocyanate modified-hydantoin epoxy/bis-phenol A (Example IV) | 418 | TF[b] | TF[b] |
| XXI | Isophorone diisocyanate modified-hydantoin epoxy/2-ethyl-1,3-hexanediol (Example V) | 340 | 3 | 2–3 |
| XXII | Isophorone diisocyanate modified-Epon 828/ | 346 | 1 | NA[c] |

TABLE 1-continued

| Coating Composition | Resin | VOC (g/l) | 24 Hour Salt Spray[a] | Cathodic Polarization[a] |
|---|---|---|---|---|
| XXIII | 2-ethyl-1,3-hexanediol (Example VI)<br>Toluene diisocyanate modified-hydantoin epoxy/<br>2-ethyl-1,3-hexanediol (Example VIII) | 415 | 3–4 | 4–5 |
| XXIV | Toluene diisocyanate modified-Epon 828/<br>2-ethyl-1,3-hexanediol (Example IX) | 362 | 4–6 | 7–8 |
| XXV | Toluene diisocyanate modified-Epon 828/<br>1,5-pentanediol (Example XI) | 362 | 5–6 | 3–4 |
| XXVI | Toluene diisocyanate modified-Eponex 151/<br>2-ethyl-1,3-hexanediol (Example XIV) | 327 | 1–2 | 1 |
| XXVII | Isophorone diisocyanate modified-Eponex 151/<br>2-ethyl-1,3-hexanediol (Example XV) | 372 | 3–4 | 2–3[d] |
| XXVIII | Toluene diisocyanate modified-Eponex 151/<br>2-ethyl-1,3-hexanediol (Example XVI) | 327 | 2–4 | 1–2[d] |
| XXIX | Isophorone diisocyanate modified-Eponex 151/<br>1,5-pentanediol (Example XVII) | 327 | 1–2 | 2–3 |

[a]Adhesion loss from scribe in millimeters
[b]TF = Total failure
[c]NA = Not available
[d]Non-scribe line associated adhesion loss observed The following examples illustrate the adverse effect on corrosion resistance of introducing non-chain-extendable resin (epoxy/diol adduct) into the primer compositions of the invention.

EXAMPLE XXX

The novel oligomer toluene diisocyanate-modified Epon 828/1,5-pentanediol, prepared in accordance with Example XI, was used with Epon 828/1,5-pentanediol prepared in accordance with Example X. The corrosion test results are presented in Table 2.

TABLE 2

| Percent Oligomer | Percent Epoxy/Diol Resin | 24 Hour Salt Spray[a] |
|---|---|---|
| 100 | 0 | 5–6 |
| 75 | 25 | 5–6 |
| 50 | 50 | 5–6[b] |
| 25 | 75 | TF[c] |
| 0 | 100 | TF |

[a]Adhesion loss from scribe in millimeters
[b]Non-scribe line adhesion loss observed
[c]TF = Total failure

EXAMPLE XXXI

The novel oligomer toluene diisocyanate-modified Epon 828/2-ethyl-1,3-hexanediol, prepared in accordance with Example IX was used with Epon 828/2-ethyl-1,3-hexanediol prepared in accordance with Example VI Part A. The corrosion test results are presented in Table 3.

TABLE 3

| Percent Oligomer | Percent Epoxy/Diol Resin | 24 Hour Salt Spray[a] |
|---|---|---|
| 100 | 0 | 4–6 |
| 75 | 25 | 6–8[b] |
| 50 | 50 | 6–8[b] |
| 25 | 75 | TF[c] |
| 0 | 100 | TF |

[a]Adhesion loss from scribe in millimeters
[b]Non-scribe line adhesion loss observed
[c]TF = Total failure

EXAMPLE XXXII

The novel oligomer toluene diisocyanate-modified hydantoin epoxy/2-ethyl-1,3-hexanediol, prepared in accordance with Example VIII, was used with hydantoin epoxy/2-ethyl-1,3-hexanediol, prepared in accordance with Example I. The corrosion test results are presented in Table 4.

TABLE 4

| Percent Oligomer | Percent Epoxy/Diol Resin | 24 Hour Salt Spray[a] |
|---|---|---|
| 100 | 0 | 4–5[b] |
| 75 | 25 | 6–8[b] |
| 50 | 50 | TF |
| 25 | 75 | TF |
| 0 | 100 | TF |

[a]Adhesion loss from scribe in millimeters
[b]Non-scribe line adhesion loss observed
[c]TF = Total failure Particular embodiments of the present invention described above are illustrative only and do not limit the scope of the invention. It wil be apparent to the skilled of the art in view of the foregoing disclosure that modifications and substitutions can be made without departing from the scope of the invention.

We claim:

1. A solvent-based resin composition comprising:
   A. chain-extendable crosslinkable urethane modified polyhydroxy oligomer containing no ester linkages and bearing three or more hydroxyl groups and a single blocked isocyanate group, comprising the reaction product of a polyol with a half-blocked diisocyanate, wherein said polyol comprises the reaction product of a diepoxide with a diol and bears four or more hydroxyl groups, and said half-blocked diisocyanate comprises the reaction product of an organic diisocyanate with monofunctional blocking agent;
   B. crosslinking agent reactive with hydroxy functionality and substantially unreactive with isocyanate functionality; and
   C. organic solvent.

2. The composition of claim 1 wherein said diepoxide bears two terminal epoxide groups.

3. The composition of claim 1 wherein said diepoxide has a molecular weight between about 100 and about 1000 and is selected from the group consisting of Bisphenol A epichlorohydrin epoxy resin, hydantoin epoxy resin, cyclic or acyclic aliphatic diepoxide and a mixture of any of them.

4. The composition of claim 1 wherein said diol has a molecular weight of between about 60 and about 500.

5. The composition of claim 4 wherein said diol is selected from the group consisting of alkyl substituted or unsubstituted propanediol, butanediol, pentanediol, hexanediol and a mixture of any of them.

6. The composition of claim 5 wherein said diol bears terminal hydroxy functionality.

7. The composition of claim 1 wherein said diol comprises aromatic diol, wherein each hydroxy is substituted on the same benzene ring or different benzene rings linked through a covalent bond or through one or more carbons of a one to seven carbon aliphatic moiety.

8. The composition of claim 7 wherein said diol is selected from the group consisting of Bisphenol A, Bisphenol B, catechol and a mixture of any of them.

9. A solvent-based resin composition comprising:
A. a urethane modified polyhydroxy oligomer of molecular weight about 300 to 1100 containing no ester linkages and bearing three or more hydroxyl groups and a single blocked isocyanate group, comprising the reaction product of a polyol with a half-blocked diisocyanate, wherein said polyol bears four or more hydroxy groups and comprises the reaction product of an epoxy resin having molecular weight of about 100 to 600 and bearing two epoxy functionality, with alkanediol of two to twenty carbons bearing two terminal hydroxyl groups, and wherein said half-blocked diisocyanate comprises the reaction product of organic diisocyanate selected from the group consisting of toluene diisocyanate, isophorone diisocyanate and a mixture of them, with monofunctional blocking agent selected from the group consisting of alcohol, amide, phenol and a mixture of any of them, said oligomer having an unblocking temperature between about 100° C. and about 190° C.;
B. crosslinking agent reactive with hydroxy functionality of said oligomer and substantially unreactive with free isocyanate functionality, selected from the group consisting of polyalkyl ethers of polymethylol melamines, said crosslinking agent and said oligomer being present in a weight ratio of about 1:1 to about 1:5, respectively; and
C. organic solvent.

10. The resin composition of claim 9 wherein said blocking agent is selected from the group consisting of butanol, 2-ethylhexanol, and a mixture of them.

11. The resin composition of claim 9 wherein said crosslinking agent is hexamethoxymethylmelamine.

12. The resin composition of claim 9 further comprising from about 0.1% to about 1% by weight catalyst comprising paratoluenesulfonic acid.

13. The resin composition of claim 9 further comprising from about 0.1% to about 1% by weight catalyst comprising dibutyl tin dilaurate.

14. The resin composition of claim 9 wherein said alkanediol is 2-ethyl-1,3-hexanediol.

15. The resin composition of claim 9 wherein said alkanediol is 1,5-pentanediol.

16. The resin composition of claim 9 wherein said epoxy resin is Bisphenol A epichlorohydrin epoxy resin.

17. The resin composition of claim 9 wherein said epoxy resin is cycloaliphatic diepoxy resin.

18. A method of making a corrosion, humidity and solvent resistant coating on a substrate, which method comprises applying to said substrate a solvent-based thermosetting coating composition comprising:
A. a chain-extendable, crosslinkable urethane modified polyhydroxy oligomer containing no ester linkages and bearing three or more hydroxyl groups and a single blocked isocyanate group, comprising the reaction product of a polyol with a half-blocked diisocyanate, wherein said polyol bears four or more hydroxyl groups, and the half-blocked diisocyanate comprises the reaction product of an organic diisocyanate with monofunctional blocking agent, wherein said monofunctional blocking agent has a de-blocking temperature of between about 100° C. and about 190° C.;
B. crosslinking agent reactive with said hydroxy functionality of said oligomer and substantially unreactive with said isocyanate functionality; and
C. organic solvent; and heating said composition to at least about 100° C. for a period of sufficient to cure said composition.

19. A corrosion, humidity and solvent resistant coating on a substrate, which coating is made according to the method of claim 18.

* * * * *